US012600298B2

(12) United States Patent
    Tsutsui et al.

(10) Patent No.: US 12,600,298 B2
(45) Date of Patent: Apr. 14, 2026

(54) CONVEYANCE INTERIOR PART

(71) Applicants: TS TECH CO., LTD., Asaka (JP);
ALPS ALPINE CO., LTD., Tokyo (JP)

(72) Inventors: Tatsuhiko Tsutsui, Tochigi (JP);
Takayoshi Ito, Tochigi (JP); **Jinichi
Tanabe, Tochigi (JP); Takashi
Takahara, Tochigi (JP); Masanori
Yabuki, Tokyo (JP); Makoto Abe**,
Tokyo (JP); Takeaki Maehata, Tokyo
(JP); Hidefumi Koizumi, Tokyo (JP);
Toshiki Nakamura, Tokyo (JP)

(73) Assignees: TS TECH CO., LTD., Asaka (JP);
ALPS ALPINE CO., LTD., Tokyo (JP)

( * ) Notice: Subject to any disclaimer, the term of this
patent is extended or adjusted under 35
U.S.C. 154(b) by 0 days.

(21) Appl. No.: 18/863,921

(22) PCT Filed: May 18, 2023

(86) PCT No.: PCT/JP2023/018651
§ 371 (c)(1),
(2) Date: Nov. 7, 2024

(87) PCT Pub. No.: WO2023/224105
PCT Pub. Date: Nov. 23, 2023

(65) Prior Publication Data
US 2025/0303960 A1     Oct. 2, 2025

Related U.S. Application Data

(60) Provisional application No. 63/343,718, filed on May
19, 2022.

(30) Foreign Application Priority Data
Apr. 25, 2023    (JP) ................................. 2023-071803

(51) Int. Cl.
B60Q 3/82        (2017.01)
B60Q 3/217      (2017.01)
B60Q 3/233      (2017.01)

(52) U.S. Cl.
CPC ............... B60Q 3/82 (2017.02); B60Q 3/217
(2017.02); B60Q 3/233 (2017.02)

(58) Field of Classification Search
CPC . F21S 41/25; F21S 41/32; F21S 41/43; B60K
35/10; B60K 35/60; H01H 9/161
(Continued)

(56) References Cited

U.S. PATENT DOCUMENTS 8,258,987 B2 *   9/2012   Anorozo .............. H03K 17/962
                                        200/600
2015/0235782 A1 *   8/2015   Park ....................... G08B 5/002
                                        200/345
(Continued)

FOREIGN PATENT DOCUMENTS

JP       2006232065 A     9/2006
JP       2014231309 A    12/2014
(Continued)

OTHER PUBLICATIONS

International Search Report (with English translation) received in
corresponding Application No. PCT/JP2023/018651, dated Jul. 11,
2023, 4 pages.

*Primary Examiner* — Thomas M Sember
(74) *Attorney, Agent, or Firm* — Dority & Manning, P.A.

(57) ABSTRACT

An armrest of a door lining includes: a skin material; a
printed layer which is disposed on a rear surface side of the
skin material; a light emission body which is disposed on a
rear surface side of the skin material and the printed layer
and displays a printed surface on the surface of the skin
material; a proximity sensor which is disposed on a rear
surface side of the skin material and detects an approach of (Continued)

a detection target; a control unit which controls the light emission body based on a detection signal of the proximity sensor; and a switch device which is disposed on a rear surface side of the skin material and detects pressure from the skin material side. The control unit controls the light emission body to emit light while the proximity sensor detects the detection target. The proximity sensor is disposed on a rear surface side of the skin material and is disposed on a front surface side of the switch device and the light emission body.

17 Claims, 12 Drawing Sheets

(58) Field of Classification Search
USPC ............................... 362/28.05; 200/313, 314
See application file for complete search history.

(56) References Cited

U.S. PATENT DOCUMENTS

| | | | |
|---|---|---|---|
| 2019/0275930 A1* | 9/2019 | Cho ..................... | G02B 6/0036 |
| 2022/0352891 A1 | 11/2022 | Kondou et al. | |
| 2023/0256822 A1 | 8/2023 | Miyanaga et al. | |

FOREIGN PATENT DOCUMENTS

| | | |
|---|---|---|
| JP | 201940802 A | 3/2019 |
| JP | 2021046108 A | 3/2021 |
| JP | 2022019750 A | 1/2022 |
| WO | WO 2022071318 A1 | 4/2022 |

* cited by examiner

UP

FRONT ←——→ REAR

DOWN

UP

VEHICLE
INTERIOR
SIDE ←——————→ VEHICLE
EXTERIOR
SIDE

DOWN

101

102 120 130 140

110

160              160

171

174b

170

174

173       150       173

190

UP

VEHICLE INTERIOR SIDE ⟷ VEHICLE EXTERIOR SIDE

DOWN

201

202   222   230   221(220)   222
210   240

260
271
274
270

290   250

UP

VEHICLE INTERIOR SIDE ←——→ VEHICLE EXTERIOR SIDE

DOWN

VEHICLE
INTERIOR
SIDE ← → VEHICLE
EXTERIOR
SIDE

UP

DOWN

CONVEYANCE INTERIOR PART

CROSS-REFERENCE TO RELATED APPLICATIONS

This application is the U.S. National Stage entry of International Application No. PCT/JP2023/018651, filed on May 18, 2023, which, in turn, claims priority to U.S. Provisional Patent Application No. 63/343,718, filed on May 19, 2022, and Japanese Patent Application No. 2023-071803, filed on Apr. 25, 2023, all of which are hereby incorporated herein by reference in their entireties for all purposes.

TECHNICAL FIELD

The present invention relates to a conveyance interior part attached inside a conveyance.

BACKGROUND ART

Conventionally, there is known a vehicle interior part that is provided inside a vehicle and includes a switch device that is easy to be operated while maintaining the good appearance of the vehicle interior part (see, for example, PATENT LITERATURE 1).

The vehicle interior part described in PATENT LITERATURE 1 includes a panel base material, a light source (light emission body) disposed on a rear surface side of the panel base material, a decorative skin material disposed on a front surface side of the panel base material and transmitting light from the light source to display an operation unit (operation area), and a push type push switch detecting when the operation unit is operated.

Further, it is disclosed that the vehicle interior part may include a human detection sensor (proximity sensor) detecting an approach of a human and emit light from the light source based on a detection signal of the human detection sensor to display an operation unit.

CITATION LIST

Patent Literature

PATENT LITERATURE 1: JP 2019-40802 A

SUMMARY OF INVENTION

Technical Problem

Incidentally, there was a demand to suitably dispose each of the proximity sensor detecting the approach of the detection target, the light emission body emitting light to display the operation unit, and the push switch detecting the pressure of the operation unit inside the conveyance interior part described in PATENT LITERATURE 1. Further, there was a demand to easily assemble these components.

An object of the present invention is to provide a conveyance interior part capable of suitably disposing each component inside the conveyance interior part.

Further, another object of the present invention is to provide a conveyance interior part capable of easily assembling each component inside the conveyance interior part.

Solution to Problem

According to a conveyance interior part of the present invention, the above-described problems are solved by a conveyance interior part provided inside a conveyance, including: a cover material which has optical transparency; a printed layer which is disposed on a rear surface side of the cover material and has a predetermined printed surface; a light emission body which is disposed on a rear surface side of the cover material and the printed layer and emits light toward the cover material and the printed layer; a proximity sensor which is disposed on a rear surface side of the cover material and detects an approach of a detection target; a control unit which controls the light emission body based on a detection signal of the proximity sensor; and a switch device which includes a push switch disposed on a rear surface side of the cover material and detecting pressure from the cover material side, wherein the control unit controls the light emission body not to emit light while the proximity sensor does not detect the detection target and controls the light emission body to emit light while the proximity sensor detects the detection target, wherein the push switch is disposed at a position corresponding to a position in which the printed surface is displayed by the light emission body in a surface of the cover material, and wherein the proximity sensor is disposed on a rear surface side of the cover material and is disposed on a front surface side of the switch device and the light emission body in a thickness direction of the conveyance interior part.

With the above-described configuration, it is possible to realize the conveyance interior part capable of suitably disposing each component inside the conveyance interior part.

Specifically, the proximity sensor is disposed on the rear surface side of the cover material and is disposed on the front surface side of the switch device (push switch) and the light emission body in the thickness direction of the conveyance interior part. Since the proximity sensor is disposed closer to the cover material side, for example, the detection accuracy of the proximity sensor can be improved.

Further, when the proximity sensor does not detect a detection target (such as a human hand), the light emission body does not emit light, so there is no impact on the design (surface design) of the interior part. Then, when the proximity sensor detects the detection target, a predetermined printed surface (for example, an operation icon) is displayed to indicate the operation position of the push switch. Furthermore, it is possible to provide a reliable operational feel by adopting the push switch.

At this time, the cover material may be a skin material which has optical transparency, the conveyance interior part may include a pad material disposed on a rear surface side of the skin material and the printed layer and having optical transparency, the switch device may include a support substrate which is disposed on a rear surface side of the light emission body and the push switch and supports the light emission body and the push switch, and the light emission body and the push switch may be disposed at different positions on the support substrate.

As described above, since the light emission body and the push switch are disposed at different positions on the support substrate, they can be disposed without interference. Further, the light emission body and the push switch are easily assembled.

At this time, the proximity sensor may be a capacitance type sensor, and the control unit may control the light emission body to emit light while the capacitance type sensor detects the detection target.

As described above, the human body (the capacitance between the human body and the capacitance type sensor electrode) can be suitably detected, and erroneous detection can be suppressed by adopting the capacitance type sensor.

At this time, the conveyance interior part may include a base material which is disposed between the cover material and the switch device in the thickness direction of the conveyance interior part, a through hole may be formed in a portion corresponding to the push switch in a surface of the base material, the switch device may include a switch transmission body which is disposed on a front surface side of the push switch and transmits pressure from the cover material side to the push switch, and a part of the switch transmission body may penetrate the through hole and be disposed at the same position as the base material in the thickness direction of the conveyance interior part.

With the above-described configuration, the push switch can be operated when the switch transmission body is pressed. For example, since the push switch cannot be operated by simply placing a finger thereon, erroneous operation can be suppressed.

At this time, the cover material may be a skin material which has optical transparency, the conveyance interior part may include a pad material which is disposed on a rear surface side of the skin material and the printed layer and has optical transparency, the base material may be disposed between the pad material and the switch device, the pad material may be attached to a surface of the base material, and the switch transmission body may not be attached to the pad material and the skin material.

With the above-described configuration, it is possible to suppress the skin material and the pad material from being stretched due to a pressing operation. Specifically, the portions of the skin material and the pad material that overlap the switch transmission body are physically distorted by the pressing operation. Therefore, it is possible to suppress tension by not bonding the skin material and the pad material to the switch transmission body.

Further, as described above, since the switch transmission body is not attached to the pad material and the skin material, it is easy to replace the switch transmission body and to perform maintenance.

At this time, the switch device may include a switch housing which accommodates the push switch and the switch transmission body which is movably attached to the switch housing, the switch housing may include a substrate attachment portion which is provided on a surface of the switch housing and is attached to a rear surface of the base material, the surface of the base material may have an inclined shape that is inclined with respect to the surface of the switch housing or a curved shape that is curved with respect to the surface, a part of the switch transmission body may protrude toward a front surface side beyond the switch housing, and wherein a protruding surface of the switch transmission body may have a shape that follows the inclined shape or curved shape of the surface of the base material.

As described above, the step surface is reduced as much as possible by setting the protruding surface of the switch transmission body to a shape that follows the inclined shape (curved shape) of the base material surface, so that the surface of the conveyance interior part can be made flat.

At this time, the switch device may include a switch housing which accommodates the push switch and the switch transmission body which is movably attached to the switch housing, the switch housing may include a substrate attachment portion which is provided on a surface of the switch housing and is attached to a rear surface of the base material, a convex attached portion for attaching the substrate attachment portion may be formed on a rear surface of the base material, and the proximity sensor may be disposed between the base material and the switch housing in the thickness direction of the conveyance interior part and be disposed between the switch transmission body and the attached portion in a direction orthogonal to the thickness direction of the conveyance interior part.

With the above-described configuration, since the proximity sensor is disposed inside the space, the displacement of the proximity sensor can be suppressed.

At this time, the proximity sensor may be positioned between the switch transmission body and the attached portion of the base material in a direction orthogonal to the thickness direction of the conveyance interior part, and the proximity sensor may not be attached to the switch transmission body and the base material.

With the above-described configuration, the proximity sensor can be positioned without being attached to the switch transmission body or the base material. Therefore, the process of attaching (bonding) the proximity sensor can be omitted.

At this time, the cover material may be a skin material which has optical transparency, the conveyance interior part may include a pad material which is disposed on a rear surface side of the skin material and the printed layer and is disposed on a front surface side of the base material, the pad material may include a first pad material which has optical transparency and a second pad material which has optical impermeability, the base material may be disposed between the pad material and the switch device, the first pad material may be disposed at a portion overlapping the switch transmission body in the entire pad material, and the second pad material may be disposed at a position overlapping the base material in the entire pad material.

With the above-described configuration, since the second pad material blocks light in the periphery of the switch transmission body, it is possible to suppress the leakage of light to the periphery of the switch transmission body.

At this time, the cover material may be a skin material which has optical transparency, the conveyance interior part may include a pad material which is disposed on a rear surface side of the skin material and the printed layer and has optical transparency, the base material may be disposed between the pad material and the switch device, the switch transmission body may be configured to transmit light emitted from the light emission body, an accommodating recess for accommodating a part of the switch transmission body may be formed on a rear surface of the pad material, and an upper portion of the switch transmission body may face the accommodating recess and be accommodated in the accommodating recess.

With the above-described configuration, the switch transmission body can be easily assembled. Further, the thickness of the pad material can be decreased, and the brightness of a predetermined printed surface (for example, an operation icon) can be increased.

At this time, an upper surface of the switch transmission body may have a curved shape or step shape and be disposed at a position above an upper surface of the base material.

With the above-described configuration, when the occupant touches (indirectly touches) the upper surface of the switch transmission body, the occupant can easily recognize the position of the switch transmission body.

At this time, an upper surface of the switch transmission body may be disposed at a position below an upper surface of the base material, and a part of the switch transmission body may be disposed at the same position of the base material in the thickness direction of the conveyance interior part.

With the above-described configuration, since a step can be formed between the upper surface of the switch transmission body and the upper surface of the base material, the occupant can easily recognize the position of the switch transmission body.

At this time, the switch device may include a switch transmission body which is disposed on a front surface side of the push switch and transmits pressure from the cover material side to the push switch, and the proximity sensor may be a capacitance type sensor and be printed on an upper surface of the switch transmission body or disposed on the upper surface of the switch transmission body.

With the above-described configuration, the capacitance type proximity sensor can accurately detect the human body located directly above the switch transmission body.

At this time, the cover material may be a skin material which has optical transparency, the conveyance interior part may include a pad material which is disposed on a rear surface side of the skin material and the printed layer and has optical transparency and a base material which is disposed between the cover material and the switch device in the thickness direction of the conveyance interior part, the proximity sensor may be disposed between the pad material and the switch device in the thickness direction of the conveyance interior part, and the proximity sensor may be attached to an upper surface of the switch transmission body and not be attached to the base material and the pad material.

With the above-described configuration, the proximity sensor and the switch transmission body can be simply assembled. Further, since the proximity sensor is not attached to the base material, the proximity sensor can be easily replaced when necessary.

At this time, the switch device may include a switch housing which accommodates the push switch and the switch transmission body which is movably attached to the switch housing, the housing may switch include a substrate attachment portion which is provided on a surface of the switch housing and is attached to a rear surface of the base material, and the proximity sensor may be disposed between the base material and the switch housing in the thickness direction of the conveyance interior part, and may not be held by the base material but by the switch housing.

With the above-described configuration, the proximity sensor and the switch device can be integrated into one unit, and the proximity sensor can be easily handled. Further, it is easy to perform operations of attaching and removing the switch device and the proximity sensor to and from the base material.

Further, with the above-described configuration, the switch device, the proximity sensor, and the light emission body are disposed together on the rear side of the base material. Therefore, if the replacement of electrical circuits of the switch device, the proximity sensor, and the light emission body are necessary, this can be easily checked. Further, the replacement is also easily performed.

At this time, the switch device may include a switch housing which accommodates the push switch and the switch transmission body which is movably attached to the switch housing, the switch housing may include a substrate attachment portion which is provided on a surface of the switch housing and is attached to a rear surface of the base material, and the proximity sensor may be disposed around the switch transmission body.

With the above-described configuration, it is possible to detect a human body (human finger) at a predetermined distance from a predetermined printed surface (for example, an operation icon). Further, since the proximity sensor is disposed around the switch transmission body, there is no need to form the proximity sensor from a transparent material as in the conventional case.

At this time, the control unit may recognize a detection signal from the push switch as valid when the detection signal from the push switch is output within a predetermined time after a detection signal from the proximity sensor is output.

With the above-described configuration, it is possible to prevent erroneous operation when something other than the detection target (for example, a human body) is erroneously detected.

At this time, the conveyance interior part may include a door lining having an armrest and a conveyance seat, the conveyance seat may include a seat cushion and a rail device which allows the seat cushion to be movable forward and backward, the rail device may include a fixed rail which is fixed to a conveyance floor and a movable rail which is attached to the fixed rail to be movable forward and backward together with the seat cushion, and the switch device may be disposed in a front portion of the armrest and be disposed at a front position of a front end of the fixed rail.

With the above-described configuration, for example, it is possible to suppress an arm or an elbow of a person from unintentionally touching the switch. Accordingly, it is possible to suppress erroneous input of the push switch.

Advantageous Effects of Invention

According to the present invention, it is possible to realize the conveyance interior part capable of suitably disposing each component therein. Further, when the proximity sensor detects a detection target, a predetermined printed surface (for example, an operation icon) is displayed, thereby indicating the operation position of the push switch. Therefore, the design (surface design) of the interior parts is not affected.

Further, according to the present invention, it is possible to dispose the light emission body and the push switch without interference. Further, the light emission body and the push switch are easily assembled.

Further, according to the present invention, it is possible to suitably detect a human body (electric charge of the human body) by adopting the capacitance type sensor.

Further, according to the present invention, when the switch transmission body is pressed, the push switch can be operated, and erroneous operation can be suppressed.

Further, according to the present invention, it is possible to suppress the skin material and the pad material from being stretched due to a pressing operation. It is easy to perform maintenance of the switch transmission body.

Further, according to the present invention, since the protruding surface of the switch transmission body is set to a shape that follows the inclined shape (curved shape) of the base material surface, the surface of the conveyance interior part can be made flat.

Further, according to the present invention, since the proximity sensor is disposed inside the space, the displacement of the proximity sensor can be suppressed.

Further, according to the present invention, the process of attaching (bonding) the proximity sensor can be omitted.

Further, according to the present invention, the leakage of light to the periphery of the switch transmission body can be suppressed.

Further, according to the present invention, the switch transmission body can be easily assembled. Further, the brightness of the printed surface (for example, the operation icon) can be increased.

Further, according to the present invention, when an occupant indirectly touches the upper surface of the switch transmission body, the position of the switch transmission body can be easily recognized.

Further, according to the present invention, the occupant can easily recognize the position of the switch transmission body.

Further, according to the present invention, the capacitance type proximity sensor can accurately detect a human body located directly above the switch transmission body.

Further, according to the present invention, the proximity sensor and the switch transmission body can be simply assembled.

Further, according to the present invention, it is easy to handle the proximity sensor.

Further, according to the present invention, a human body (human finger) can be detected at a predetermined distance from a predetermined printed surface (for example, an operation icon).

Further, according to the present invention, erroneous operation can be suppressed even if something other than the detection target is erroneously recognized.

Further, according to the present invention, erroneous input of the push switch can be suppressed.

DESCRIPTION OF EMBODIMENTS

Hereinafter, embodiments according to the present invention will be described with reference to FIGS. 1 to 12.

This embodiment relates to a vehicle interior part (door lining) that is attached inside a vehicle and that enables each component of the "vehicle interior part" to be suitably disposed inside the vehicle.

Furthermore, the "front to rear direction of the vehicle (front to rear direction)" refers to the front to rear direction when the vehicle is normally traveling, and the "vehicle interior side of the width direction of the vehicle (width direction)" refers to the interior side of the vehicle relative to the vehicle door.

First Embodiment

A conveyance interior part (door lining 1) of a first embodiment will be described with reference to FIGS. 1 to 5.

Figure 1:
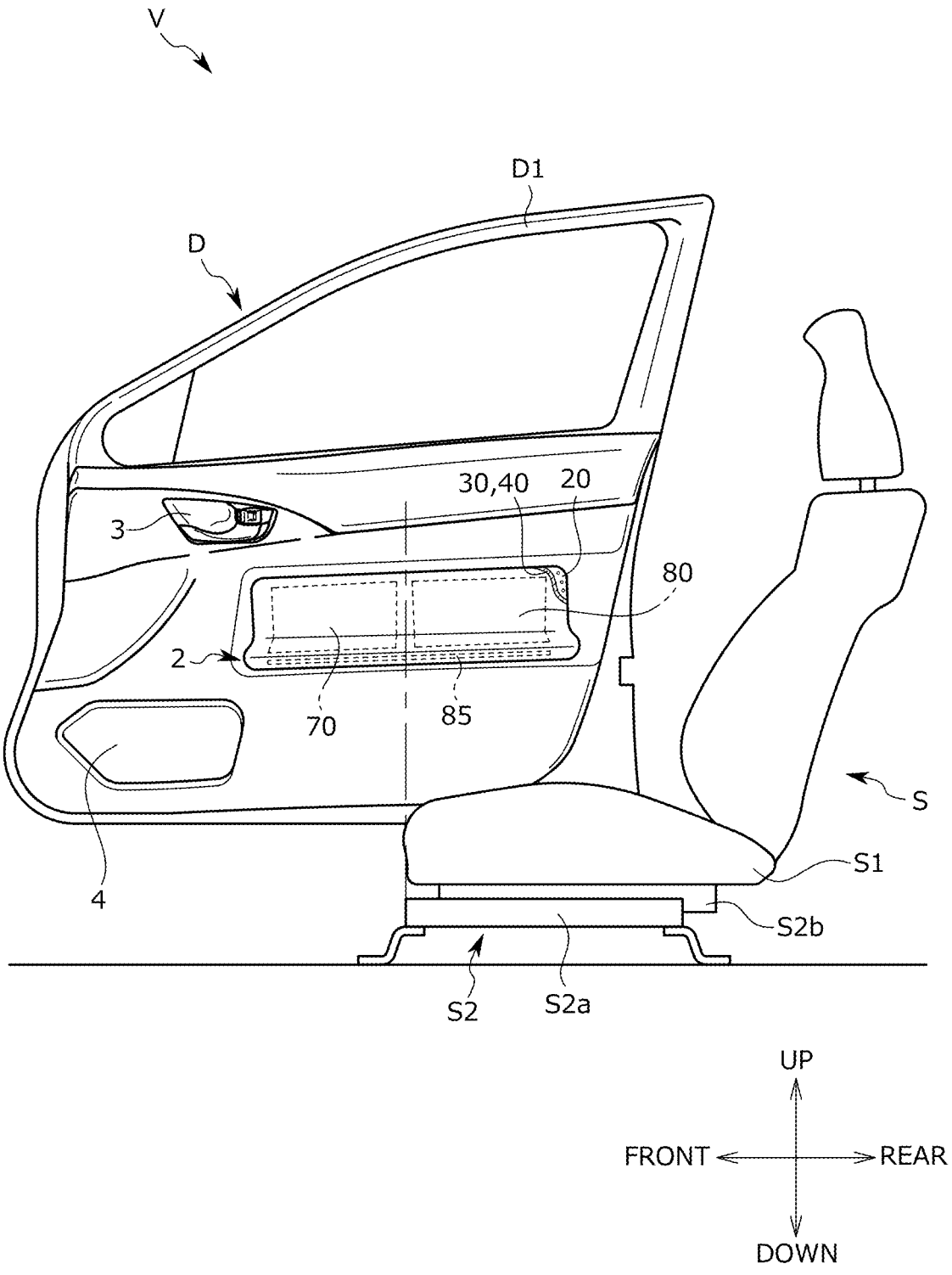
FIG. 1 is a side view of a conveyance interior part (door lining).

As shown in FIG. 1, the door lining 1 is an interior part that is provided inside a vehicle V and decorates the vehicle interior side of a vehicle door D, and is composed of a group of parts that are attached to a door panel D1 that serves as the base plate of the vehicle door D.

The door lining 1 includes an armrest 2 for supporting the arms of a seated occupant, an operation handle 3 for opening and closing the vehicle door D, which is disposed above the front portion of the armrest 2, and a pocket 4 disposed below the front portion of the armrest.

A switch device 70 for operating various movable devices is provided inside the armrest 2. Further, a planar door heater 80 for heating the surface of the armrest 2 and a lighting device 85 for lighting a line-shaped light are provided inside the armrest 2.

The switch device 70 is disposed in the front portion of the armrest 2. The door heater 80 is disposed behind the switch device 70. The lighting device 85 is provided on the side surface of the armrest 2 on the vehicle interior side, and is disposed to overlap the switch device 70 and the door heater 80 in the front to rear direction of the vehicle.

A vehicle seat S is provided inside the vehicle V to be located on the vehicle interior side of the door lining 1.

The vehicle seat S includes a seat cushion S1 that supports a seated occupant from below, and a rail device S2 that supports the seat cushion S1 so that the seat cushion S1 can move forward and backward relative to a vehicle body floor.

The rail device S2 includes a fixed rail S2a which is fixed to a conveyance floor and a movable rail S2b which is attached to the fixed rail S2a to be movable forward and backward together with the seat cushion S1.

In the above-described configuration, as shown in FIG. 1, the switch device 70 is disposed in the front portion of the armrest 2, and is disposed at a front position of the front end of the fixed rail S2a.

In this way, for example, it is possible to suppress a person's arm or elbow from accidentally touching the switch device 70. In other words, it is possible to suppress erroneous input of the switch device 70.

Structure (Inner Structure) of Armrest

The structure (inner structure) of the armrest 2 will be described in detail below.

Figure 2:
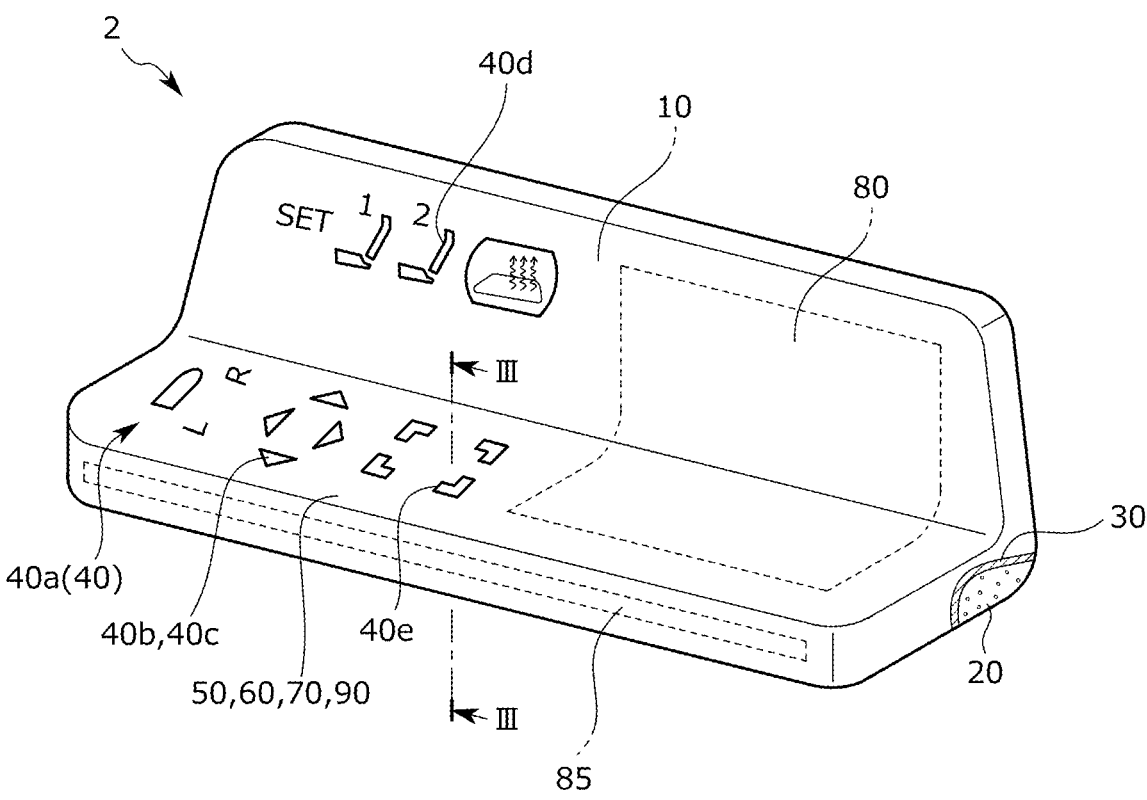
FIG. 2 is a perspective view of an armrest of the door lining.

As shown in FIGS. 1 and 2, the armrest 2 is a component of the door lining 1 and includes the switch device 70 that can be operated by a seated occupant.

The switch device 70 is also called a stealth switch, and is normally in a state in which an operation unit (operation icon) is not displayed, but when detecting the approach of a human body (human fingers), the operation unit is displayed on the upper surface of the armrest 2.

The operation unit is a predetermined printed surface 40a that is projected on the upper surface of the armrest 2. A push switch 73 is built in at a position corresponding to the printed surface 40a, and the seated occupant can operate a predetermined push switch 73 by pressing a predetermined operation icon on the printed surface 40*a*.

To explain the operation unit (printed surface 40*a*) in detail, for example, an operation icon 40*b* for adjusting the angle of the side mirror of the vehicle V and an operation icon 40*c* for adjusting the opening and closing of the power window are displayed on the upper surface of the front portion of the armrest 2. Further, an operation icon 40*d* for operating the reclining mechanism and height link mechanism of the vehicle seat S, and a multi-purpose touch pad 40*e* are displayed.

The seated occupant cannot perform operation by simply touching the operation unit (printed surface 40*a*). Instead, the occupant can perform operation by pressing the operation unit and depressing the push switch 73 built in at a position corresponding to the operation unit. In this way, erroneous operation can be prevented. In addition, it is possible to provide a reliable operational feel (such as a clicking sensation) by adopting a push type switch.

Figure 3:
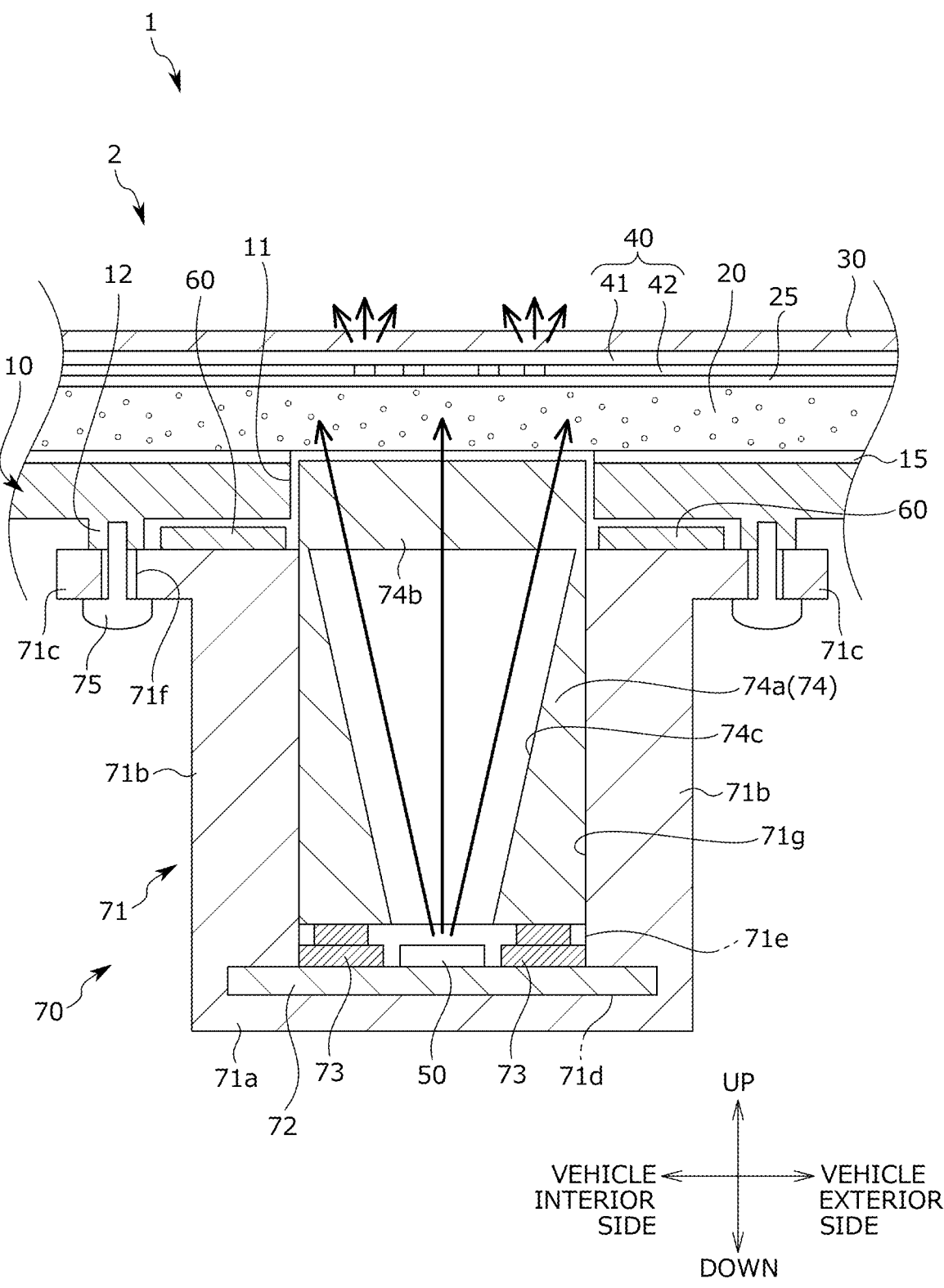
FIG. 3 is a cross-sectional view taken along a line III-III of the armrest and showing a state before a push switch is pressed.
Figure 4:
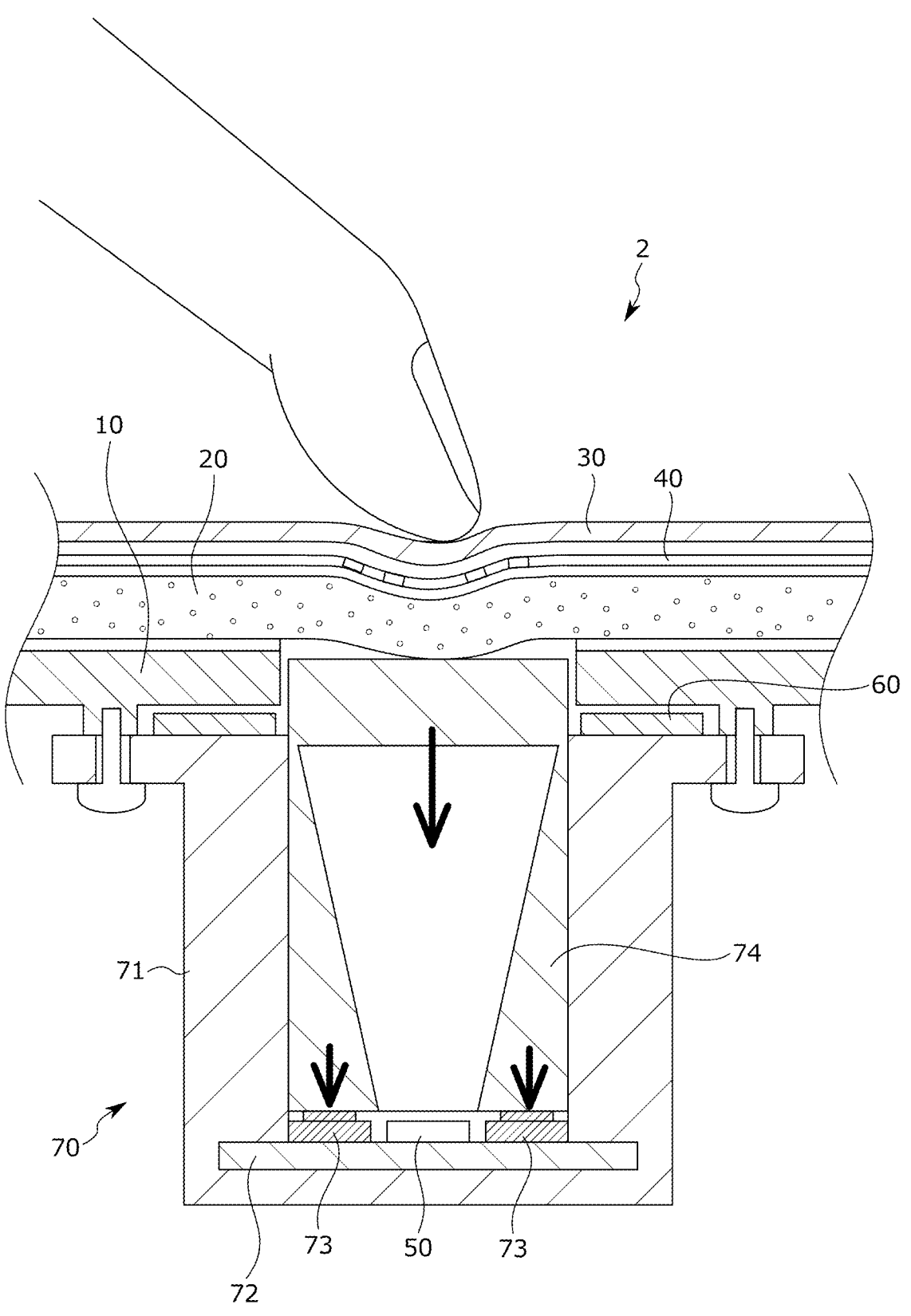
FIG. 4 is a cross-sectional view taken along a line III-III of the armrest and showing a state in which the push switch is pressed.
Figure 5:
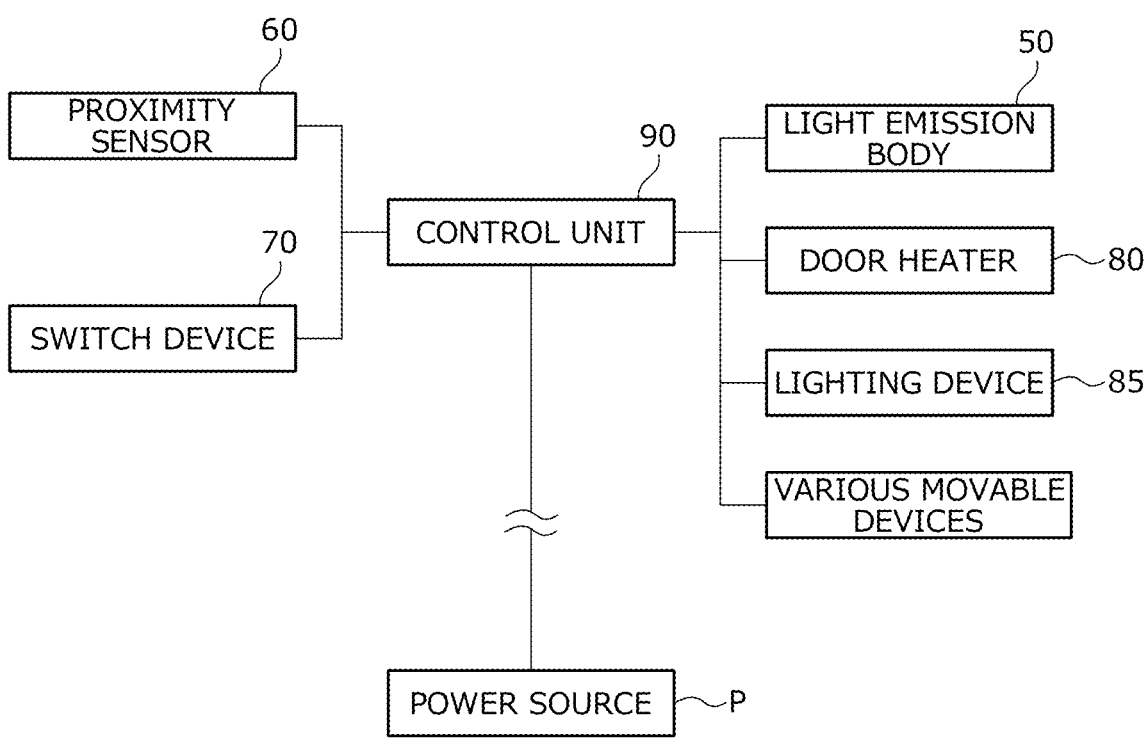
FIG. 5 is a block diagram illustrating an electrical circuit of the door lining.

As shown in FIGS. 3 to 5, the armrest 2 includes an armrest base material 10, a pad material 20 having optical transparency, a skin material 30 having optical transparency, a printed layer 40 having a predetermined printed surface 40*a*, a light emission body 50, a proximity sensor 60, the switch device 70 having the push switch 73, and a control unit 90.

An adhesive 15 is provided between the armrest base material 10 and the pad material 20. Further, an adhesive 25 is provided between the pad material 20 and the printed layer 40.

The control unit 90 may be mounted inside the armrest 2, inside the door lining 1, or outside the door lining 1.

The armrest base material 10 is, for example, a panel base material made of resin, and extends long in the front to rear direction of the vehicle.

A through hole 11 that penetrates in the vertical direction is formed in a portion of the surface (upper surface) of the armrest base material 10 that corresponds to the light emission body 50 and the push switch 73. Additionally, a plurality of convex attachment bosses 12 (attached portions) are formed around the through hole 11 on the surface of the armrest base material 10.

Furthermore, the armrest base material 10 may have either optical transparency or optical impermeability.

The pad material 20 is, for example, urethane foam, and extends long along the surface of the armrest base material 10 in the front to rear direction of the vehicle.

The pad material 20 is adhered to the surface of the armrest base material 10, and is disposed on the front surface side of the armrest base material 10 and on the rear surface side of the skin material 30 and the printed layer 40.

The skin material 30 is a cover material (coating material) having optical transparency and made of a resin material, fabric, genuine leather, or the like.

The printed layer 40 is disposed on the rear surface of the skin material 30.

Furthermore, the armrest 2 may be provided with a decorative skin material in which the skin material 30 and the printed layer 40 are integrally formed. In other words, the skin material 30 and the printed layer 40 may be collectively referred to as a decorative skin material (printed skin material).

The printed layer 40 is a film (multi-layer film) having a predetermined printed surface 40*a*, and is disposed between the skin material 30 and the pad material 20.

The printed layer 40 includes a first printed layer 41 which forms a predetermined printed pattern that imitates a predetermined color, pattern, fabric, or leather and a second printed layer 42 which is disposed on the rear surface side of the first printed layer 41 and forms a predetermined light-shielding pattern (predetermined passage holes) that corresponds to the operation unit (operation icon).

The printed surface 40*a* is formed by the first printed layer 41 and the second printed layer 42.

The armrest 2 displays the decoration formed by the first printed layer 41 and the skin layer on the entire surface of the skin material 30 or the decoration formed by the first printed layer 41 by not emitting light from the light emission body 50. Further, the armrest 2 can form the operation unit by displaying the operation icon on the surface of the skin material 30 in such a manner that light is emitted from the light emission body 50 and is transmitted through a predetermined through hole of the second printed layer 42.

The light emission body 50 is a light source such as an LED lamp which is disposed on the rear surface side of the armrest base material 10 and emits light toward the skin material 30 and the printed layer 40.

The light emission body 50 is assembled inside the switch device 70 (switch housing 71).

The proximity sensor 60 is, for example, a capacitance type sensor that detects the approach of a detection target in a non-contact manner and transmits a detection signal to the control unit 90.

The proximity sensor 60 may be an inductive sensor, a magnetic sensor, an ultrasonic sensor, a radio wave sensor, an air pressure sensor, a photoelectric sensor, etc. By adopting a capacitance type sensor, the human body (electric charge of the human body) detected and erroneous detection can be suppressed.

The proximity sensor 60 is disposed between the armrest base material 10 and the switch device 70 in the thickness direction of the armrest 2, and is also disposed between the attachment boss 12 and a switch transmission body 74 in a direction (width direction) orthogonal to the thickness direction of the armrest 2.

Furthermore, as shown in FIG. 3, the attachment boss 12 is provided in the armrest base material 10, but may be provided on the upper surface of the switch housing 71. In that case, the proximity sensor 60 may be disposed between the attachment boss 12 and the switch transmission body 74 in a direction (the width direction of the switch housing 71) orthogonal to the thickness direction of the armrest 2.

The switch device 70 is a press type (mechanical) switch module, and is assembled to the rear surface of the armrest base material 10.

Specifically, the switch device 70 includes the box-shaped switch housing 71, a support substrate 72 which is mounted inside the switch housing 71, the plurality of push switches 73 which are attached onto the support substrate 72, and the switch transmission body 74 which is disposed on the front surface side of the push switch 73 and is movably attached to the switch housing 71.

The switch housing 71 includes a bottom wall portion 71*a* which is long in the front to rear direction of the vehicle, a cylindrical side wall portion 71*b* which extends from each of both ends of the bottom wall portion 71*a* in the width direction toward the armrest base material 10, and a flange wall portion 71*c* which protrudes outward from the side wall portion 71*b*.

The bottom wall portion 71*a* of the switch housing 71 is provided with a first accommodating portion 71*d* (accommodating groove) which accommodates the support substrate 72 and a second accommodating portion 71*e* (accommodating recess) which accommodates the push switch 73 and the light emission body 50.

A substrate attachment portion 71f (base attachment hole) that can be attached to the attachment boss 12 of the armrest base material 10 is formed on the surface of the flange wall portion 71c of the switch housing 71.

The substrate attachment portion 71f is connected to the attachment boss 12 by an attachment bolt 75.

In the switch housing 71, the switch transmission body 74 is accommodated in an inner space 71g surrounded by the bottom wall portion 71a, the side wall portion 71b, and the flange wall portion 71c.

The support substrate 72 is, for example, a circuit board, which supports the push switch 73 and the light emission body 50 from below and is electrically connected to the push switch 73 and the light emission body 50.

The support substrate 72 is connected by wire or wirelessly to the proximity sensor 60 and the control unit 90.

The push switch 73 is a pressure switch (physical switch) that detects pressure from the skin material 30, and is disposed to be able to come into contact with the switch transmission body 74.

When the push switch 73 is pressed from above by the switch transmission body 74, the switch is switched from an "off state" shown in FIG. 3 to an "on state" shown in FIG. 4 with a clicking sensation.

The plurality of push switches 73 are disposed on the support substrate 72 at positions sandwiching the light emission body 50 therebetween.

The plurality of push switches 73 are disposed on the surface of the skin material 30 at positions corresponding to the printed surface 40a (operation icon) displayed by the light emission body 50.

The push switch 73 is, for example, a push switch that has a fixed contact and a dome-shaped movable contact, and is switched between an "on state" and an "off state" with a clicking sensation by the up and down movement of the switch transmission body 74.

The switch transmission body 74 is a member that transmits pressure from the skin material 30 to the push switch 73. The switch transmission body 74 integrally has a hollow portion 74a that is long in the height direction of the switch housing 71 and a solid portion 74b that is provided on the upper surface of the hollow portion 74a.

Furthermore, the switch transmission body 74 has optical transparency and is configured to be able to transmit light from the light emission body 50.

The hollow portion 74a has a hollow hole 74c with a trapezoidal cross section. The hollow hole 74c is formed to become wider from the rear surface to the front surface.

The hollow portion 74a is accommodated in the inner space 71g of the switch housing 71 and comes into contact with the surface of the push switch 73.

The solid portion 74b protrudes upward from the switch housing 71, and is inserted into the through hole 11 of the armrest base material 10. The solid portion 74b is able to come into contact with the rear surface of the pad material 20.

As shown in FIG. 5, the control unit 90 is a control device (controller) that performs overall electrical control of the door lining 1 (armrest 2).

The control unit 90 is electrically connected to the proximity sensor 60, the switch device 70 (push switch 73), the light emission body 50, the door heater 80, the lighting device 85, and various movable devices.

The control unit 90 controls the supply of electricity to the light emission body 50 based on a detection signal from the proximity sensor 60. Further, the supply of electricity to the door heater 80, the lighting device 85, and the movable device is controlled based on a detection signal from the switch device 70.

In this way, the control unit 90 can display the printed surface 40a (operation icon) on the surface of the skin material 30 based on the user operation via the proximity sensor or operate various movable devices based on the user operation input via the push switch 73.

Further, as shown in FIG. 5, the control unit 90 is connected by wire or wirelessly to a power source P (e.g., an on-board battery) provided in the vehicle V, and performs electrical control of the door lining 1 while receiving and transmitting electricity between the power source P and the control unit 90.

Furthermore, the control unit 90 may receive electricity from a power generating component or a power storage component attached to the vehicle V.

In the above-described configuration, as shown in FIGS. 3 and 4, the control unit 90 controls the light emission body 50 not to emit light while the proximity sensor 60 does not detect a human body (a human finger), and controls the light emission body 50 to emit light while the proximity sensor 60 detects a human body (a human finger).

In this way, only when the proximity sensor 60 detects a human body, the printed surface 40a (operation icon) is displayed to indicate the operation position of the push switch 73. Therefore, the surface design of the door lining 1 is not affected under normal circumstances.

In the above-described configuration, as shown in FIG. 3, a part (solid portion 74b) of the switch transmission body 74 passes through the through hole 11 of the armrest base material 10 and is disposed at the same position as the armrest base material 10 in the thickness direction of the armrest 2.

In this way, the switch transmission body 74 can be used to suitably press the push switch 73.

In the above-described configuration, as shown in FIG. 3, the switch transmission body 74 is not attached to the pad material 20 and the skin material 30.

In this way, the skin material 30 and the pad material 20 can be suppressed from being stretched when the seated occupant performs a pressing operation. Specifically, the portions of the skin material 30 and the pad material 20 that overlap the switch transmission body 74 are physically distorted by the pressing operation. Therefore, physical deformation (stretching) can be suppressed by not bonding the skin material 30 and the pad material 20 to the switch transmission body.

In the above-described configuration, as shown in FIG. 3, the proximity sensor 60 is disposed between the armrest base material 10 and the switch housing 71 in the thickness direction of the armrest 2, and is disposed between the switch transmission body 74 and the attachment boss 12 in the width direction of the armrest 2.

In this way, since the proximity sensor 60 is disposed inside the space, the displacement of the proximity sensor 60 can be suppressed.

In the above-described configuration, as shown in FIG. 3, the proximity sensor 60 is positioned between the switch transmission body 74 and the attachment boss 12 in the width direction of the armrest 2. Then, the proximity sensor 60 is not attached to the switch transmission body 74 and the armrest base material 10.

In this way, the process of attaching (bonding) the proximity sensor can be omitted.

In the above-described configuration, as shown in FIG. 3, the proximity sensor 60 is not attached to the armrest base material 10, the switch housing 71, and the switch transmission body 74 with adhesive or the like. On the other hand, the proximity sensor 60 may be attached to the upper surface of the switch housing 71 (side wall portion 71*b*) or the flange wall portion 71*c* by adhesive, double-sided tape, caulking, or the like. In other words, the proximity sensor 60 and the switch device 70 may be integrated into one unit.

In this way, it is easy to handle the proximity sensor 60. Further, the attachment and detachment of the proximity sensor 60 and the switch device 70 to the armrest base material 10 becomes easier.

In the above-described configuration, as shown in FIG. 3, the electrical circuits of the light emission body 50, the proximity sensor 60, and the switch device 70 are integrated into one unit and are disposed on the rear side of the armrest base material 10.

Therefore, it is easy to check the electrical circuits of the light emission body 50, the proximity sensor 60, and the switch device 70. Further, if replacement of the electric circuit becomes necessary, the electrical circuit can be easily replaced.

In the above-described configuration, as shown in FIG. 3, the proximity sensor 60 is disposed around the switch transmission body 74 and is disposed at a position different from the switch transmission body 74. Therefore, even if the position (recognition position) in the front, back, right and left directions relative to the operation icon varies slightly, the switch transmission body 74 (push switch 73) can always detect the human body (human fingers) while maintaining a predetermined distance from the operation icon.

In general, when the proximity sensor 60 is disposed at a position overlapping the switch transmission body 74, the result is different depending on whether the finger approaches the center of the operation icon directly above the switch transmission body 74 in the front to rear and left to right directions or the end of the operation icon. Specifically, the facing area between the finger and the proximity sensor is larger when the finger approaches the center, and the capacitance value is also large. Therefore, it is easier to detect a human body (human fingers) when the finger approaches the center of the operation icon, even if the finger is at a somewhat distant distance, compared to when the finger approaches the end of the operation icon.

According to the configuration of the above-described embodiment, the proximity sensor 60 is disposed around the switch transmission body 74. Therefore, even if a person's finger is placed in any position in the front, back, left, and right directions of the operation icon directly above the switch transmission body 74, the facing area between the finger and the proximity sensor remains almost the same. As a result, the human body (human fingers) can always be detected at a predetermined distance from the operation icon.

Further, since the proximity sensor 60 is disposed around the switch transmission body 74, there is no need to form the proximity sensor 60 from a transparent material as in the conventional case.

In the above-described configuration, the skin material 30 directly above the switch transmission body 74 does not protrude more than the surrounding skin material 30. In this case, it is preferable to design the through hole 11 to be larger than the size of the human finger and smaller than the size of the human elbow.

Specifically, when the through hole 11 has a circular shape, the diameter is set to 10 mm to 78 mm, preferably 15 mm to 48 mm. When the through hole 11 has a rectangular shape, the distance between the opposing sides of the through hole 11 is set to 10 mm to 78 mm, preferably 15 mm to 48 mm.

In this way, the switch transmission body 74 can be suitably pressed with a finger, and at the same time, even if the elbow accidentally touches the switch transmission body 74 (the portion corresponding to the switch transmission body 74), erroneous input can be prevented.

In the above-described configuration, the control unit 90 controls the supply of electricity to the light emission body 50 based on the detection signal from the proximity sensor 60, and displays the operation icon. Further, the supply of electricity to the door heater 80, the lighting device 85, and the movable devices is controlled based on a detection signal from the push switch 73.

Furthermore, the control unit 90 may recognize the detection signal from the push switch 73 as valid only when the detection signal from the push switch 73 is output within a predetermined time after the detection signal from the proximity sensor 60 is output. In this way, even if something other than a human body is erroneously recognized, erroneous operation can be suitably prevented.

Second Embodiment

Figure 6:
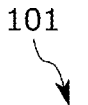
FIG. 6 is a cross-sectional view of a door lining (armrest) of a second embodiment.

Next, a door lining 101 of a second embodiment will be described with reference to FIG. 6.

Furthermore, description of the same contents as those of the door lining 1 described above will be omitted.

An armrest 102 of the door lining 101 includes an armrest base material 110, a pad material 120, a skin material 130, a printed layer 140, a light emission body 150, a proximity sensor 160, a switch device 170, and a control unit 190.

The surface of the armrest base material 110 has an inclined shape that is inclined with respect to the surface (flat surface) of a switch housing 171.

A part (solid portion 174*b*) of the switch transmission body 174 protrudes toward the front surface side beyond the switch housing 171. The protruding surface of the switch transmission body 174 has a shape that follows the inclined shape of the surface of the armrest base material 110.

In this way, the step surface between the surface of the armrest base material 110 and the protruding surface of the switch transmission body 174 is reduced as much as possible, so that the surface of the armrest 102 can be made flat.

Furthermore, the surface of the armrest base material 110 may have a curved shape.

The proximity sensor 160 is disposed between the armrest base material 110 and the switch device 170 (switch housing 171) in the thickness direction of the armrest 102.

The proximity sensor 160 is attached (adhered) to the upper surface of the switch housing 171 and is not attached to the armrest base material 110.

In this way, the proximity sensor 160 and the switch transmission body 174 can be simply assembled. Further, since the proximity sensor 160 and the armrest base material 110 are not attached, the proximity sensor 160 can be easily replaced when necessary.

Third Embodiment

Figure 7:
FIG. 7 is a cross-sectional view of a door lining (armrest) of a third embodiment.

Next, a door lining 201 of a third embodiment will be described with reference to FIG. 7.

Furthermore, description of the same contents as those of the door lining 1 described above will be omitted.

The door lining 201 (armrest 202) includes an armrest base material 210, a pad material 220, a skin material 230, a printed layer 240, a light emission body 250, a proximity sensor 260, a switch device 270, and a control unit 290.

The pad material 220 includes a first pad material 221 having optical transparency and a second pad material 222 having optical impermeability.

The armrest base material 210 is disposed between the pad material 220 and a switch device 271.

The first pad material 221 is disposed at a portion overlapping the switch transmission body 274 in the entire pad material 220, and the second pad material 222 is disposed at a position overlapping the armrest base material 210 in the entire pad material 220.

In this way, since the second pad material 222 blocks light in the periphery of the switch transmission body 274, leakage of light to the periphery of the switch transmission body 274 can be suppressed.

Fourth Embodiment

Figure 8:
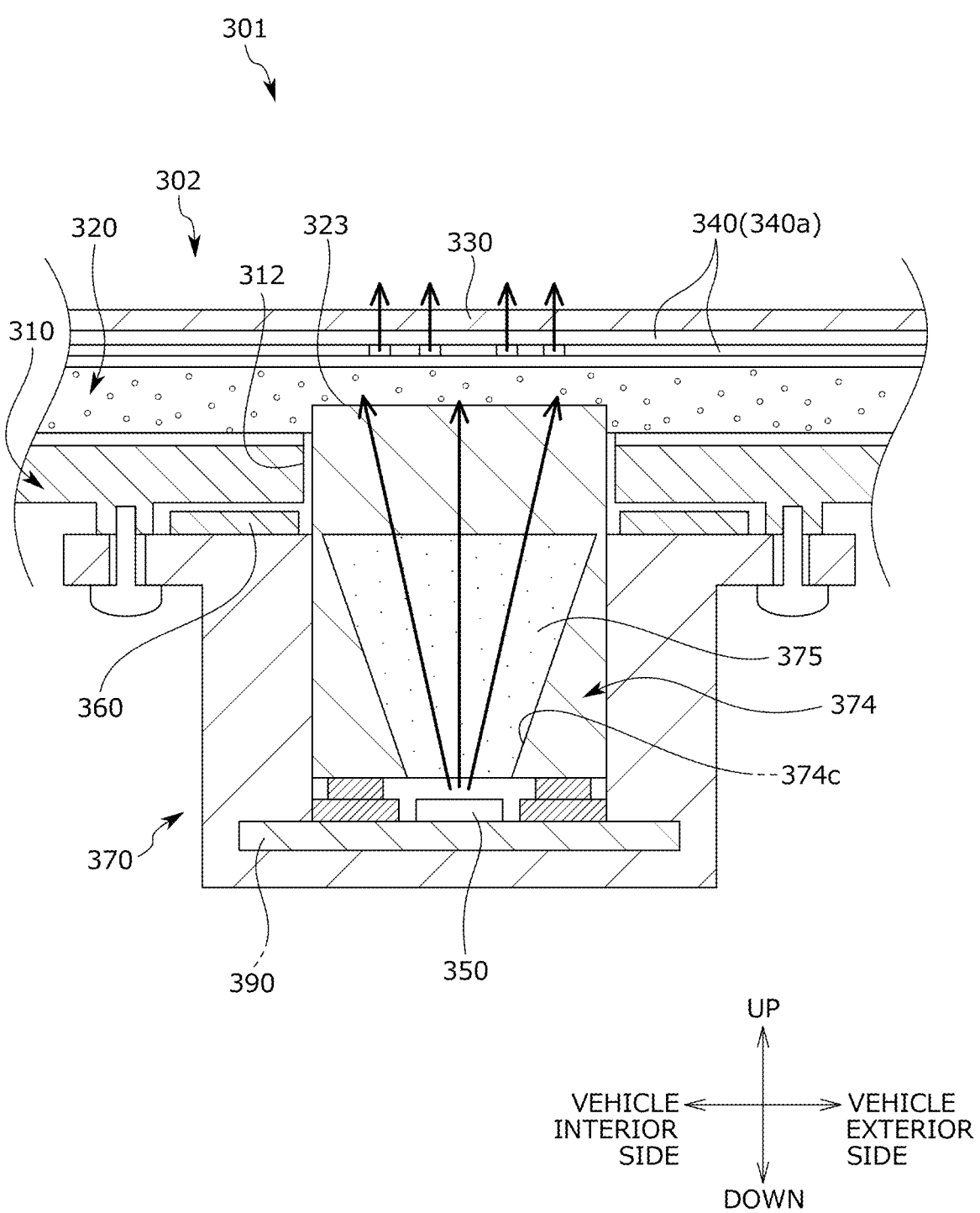
FIG. 8 is a cross-sectional view of a door lining (armrest) of a fourth embodiment.

Next, a door lining 301 of a fourth embodiment will be described with reference to FIG. 8.

Furthermore, description of the same contents as those of the door lining 1 described above will be omitted.

The door lining 301 (armrest 302) includes an armrest base material 310, a pad material 320, a skin material 330, a printed layer 340, a light emission body 350, a proximity sensor 360, a switch device 370, and a control unit 390.

The armrest base material 310 is disposed between the pad material 320 and the switch device 370.

The switch transmission body 374 is configured to be able to transmit light emitted from the light emission body 350.

An accommodating recess 323 for accommodating a part of the switch transmission body 374 is formed on the rear surface of the pad material 320.

The upper portion of the switch transmission body 374 penetrates a through hole 312, faces the accommodating recess 323, and is accommodated in the accommodating recess 323.

In this way, the switch transmission body 374 can be easily assembled. Further, the thickness of the pad material 320 can be decreased, and the brightness of a printed surface 340a of the printed layer 340 can be increased.

The switch transmission body 374 has a lens 375 accommodated in a hollow hole 374c thereof, which guides the light from the light emission body 350 while diffusing the light.

The lens 375 is a diffusion lens having an inverted trapezoidal cross section. Furthermore, the lens 375 contains a diffusion material, so that the lens 375 can guide the light from the light emission body 350 toward the skin material 330 and the printed layer 340 while diffusing the light.

Fifth Embodiment

Figure 9:
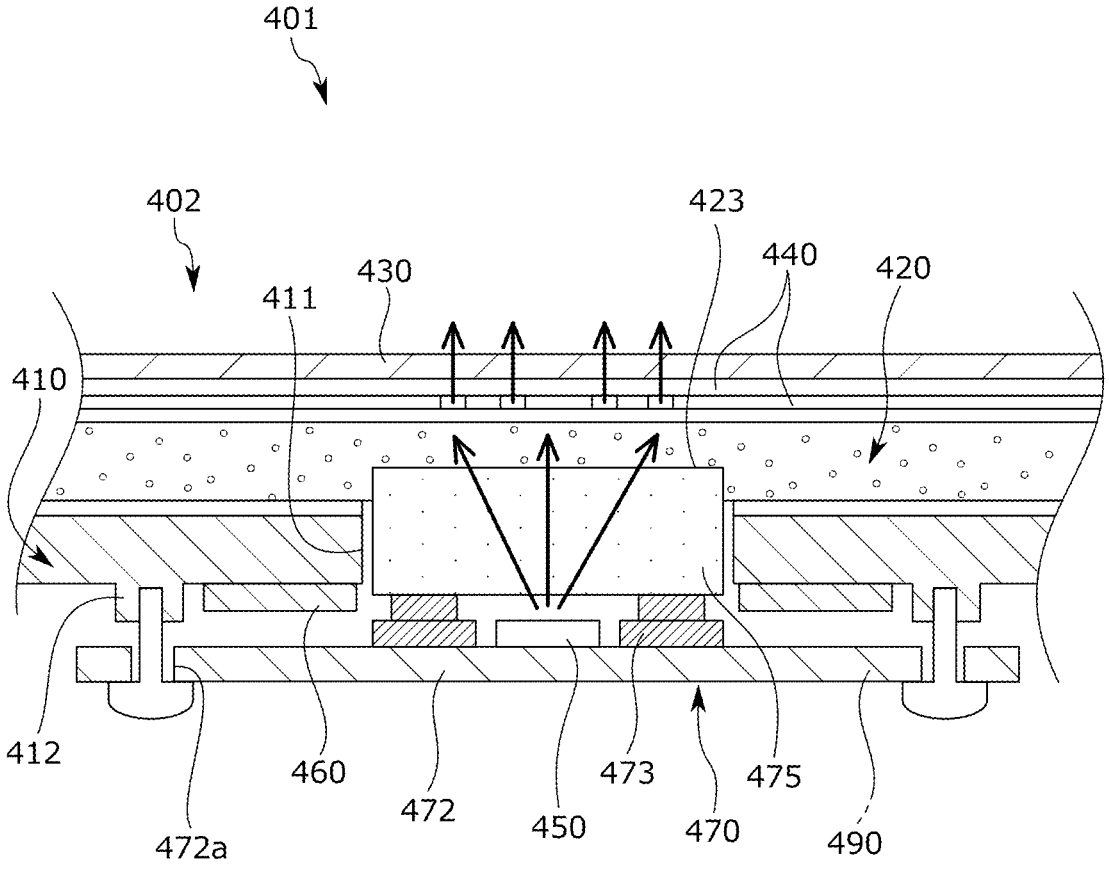
FIG. 9 is a cross-sectional view of a door lining (armrest) of a fifth embodiment.
Figure 9:
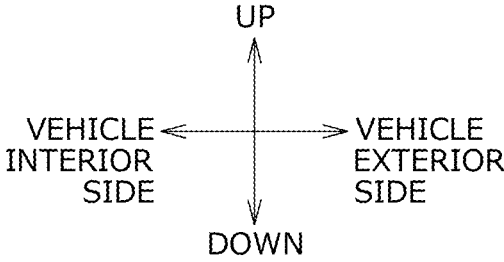

Next, a door lining 401 of a fifth embodiment will be described with reference to FIG. 9.

Furthermore, description of the same contents as those of the door lining 1 described above will be omitted.

The door lining 401 (armrest 402) includes an armrest base material 410, a pad material 420, a skin material 430, a printed layer 440, a light emission body 450, a proximity sensor 460, a switch device 470, and a control unit 490.

The switch device 470 includes a support substrate 472, a push switch 473, and a lens 475.

A substrate attachment portion 472a is formed at both ends of the support substrate 472 in the width direction.

The support substrate 472 is directly assembled to the armrest base material 410 by fastening the substrate attachment portion 472a and the attachment boss 412 with bolts.

The lens 475 is a diffusion lens that is in contact with the surface of the push switch 473 and is movably attached to the support substrate 472. That is, the lens 475 functions to transmit the pressure from the skin material 430 to the push switch 473.

The lens 475 penetrates the armrest base material 410 (through hole 411), faces the pad material 420 (accommodating recess 423), and is partially accommodated in the accommodating recess 423.

With the above-described configuration, the switch device 470 can be simplified and the switch device 470 can be easily assembled. Further, the thickness of the pad material 420 and the switch device 470 can be decreased, and the brightness of the printed layer 440 can be increased.

Sixth Embodiment

Figure 10:
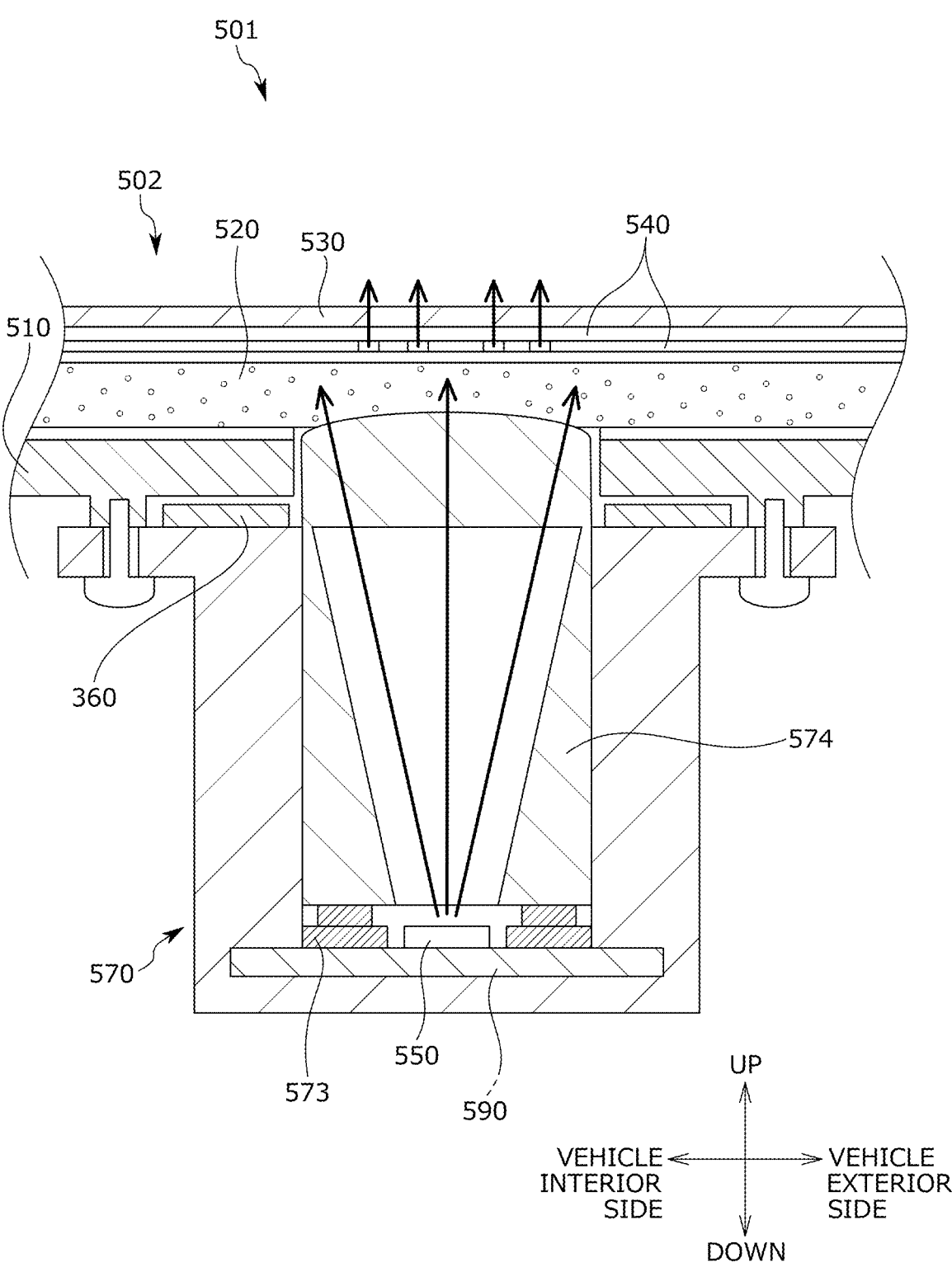
FIG. 10 is a cross-sectional view of a door lining (armrest) of a sixth embodiment.

Next, a door lining 501 of a sixth embodiment will be described with reference to FIG. 10.

Furthermore, description of the same contents as those of the door lining 1 described above will be omitted.

The door lining 501 (armrest 502) includes an armrest base material 510, a pad material 520, a skin material 530, a printed layer 540, a light emission body 550, a proximity sensor 560, a switch device 570, and a control unit 590.

The switch device 570 includes a push switch 573 and a switch transmission body 574.

The upper surface of the switch transmission body 574 has a curved shape and protrudes in a convex shape toward the skin material 530. The upper surface of the switch transmission body 574 may have a step shape.

The upper end of the switch transmission body 574 is disposed above the upper surface of the armrest base material 510 and is in contact with the rear surface of the pad material 520.

With the above-described configuration, it is easy to recognize the position of the switch transmission body 574 when the occupant touches (indirectly touches) the upper surface of the switch transmission body 574.

In the above-described configuration, the upper surface of the switch transmission body 574 protrudes in a convex shape toward the skin material 530, but the upper surface of the switch transmission body 574 may be configured in an opposite manner to be recessed in a concave shape toward the armrest base material 510. That is, the upper end of the switch transmission body 574 may be disposed at a position below the upper surface of the armrest base material 510.

Even in that case, it is possible to form a step between the upper surface of the switch transmission body 574 and the upper surface of the armrest base material 510. Therefore, when the occupant touches (indirectly touches) the upper surface of the switch transmission body 574, the occupant can easily recognize the position of the switch transmission body 574.

In the above-described configuration, the outer periphery (outer periphery of the upper end) of the switch transmission body 574 is preferably chamfered (R chamfer, C chamfer).

In this way, it is possible to suppress the outer periphery of the switch transmission body 574 from unintentionally coming into contact with the pad material 520 or the skin material 530 and affecting the pad material 520 or the skin material 530.

Seventh Embodiment

Figure 11:
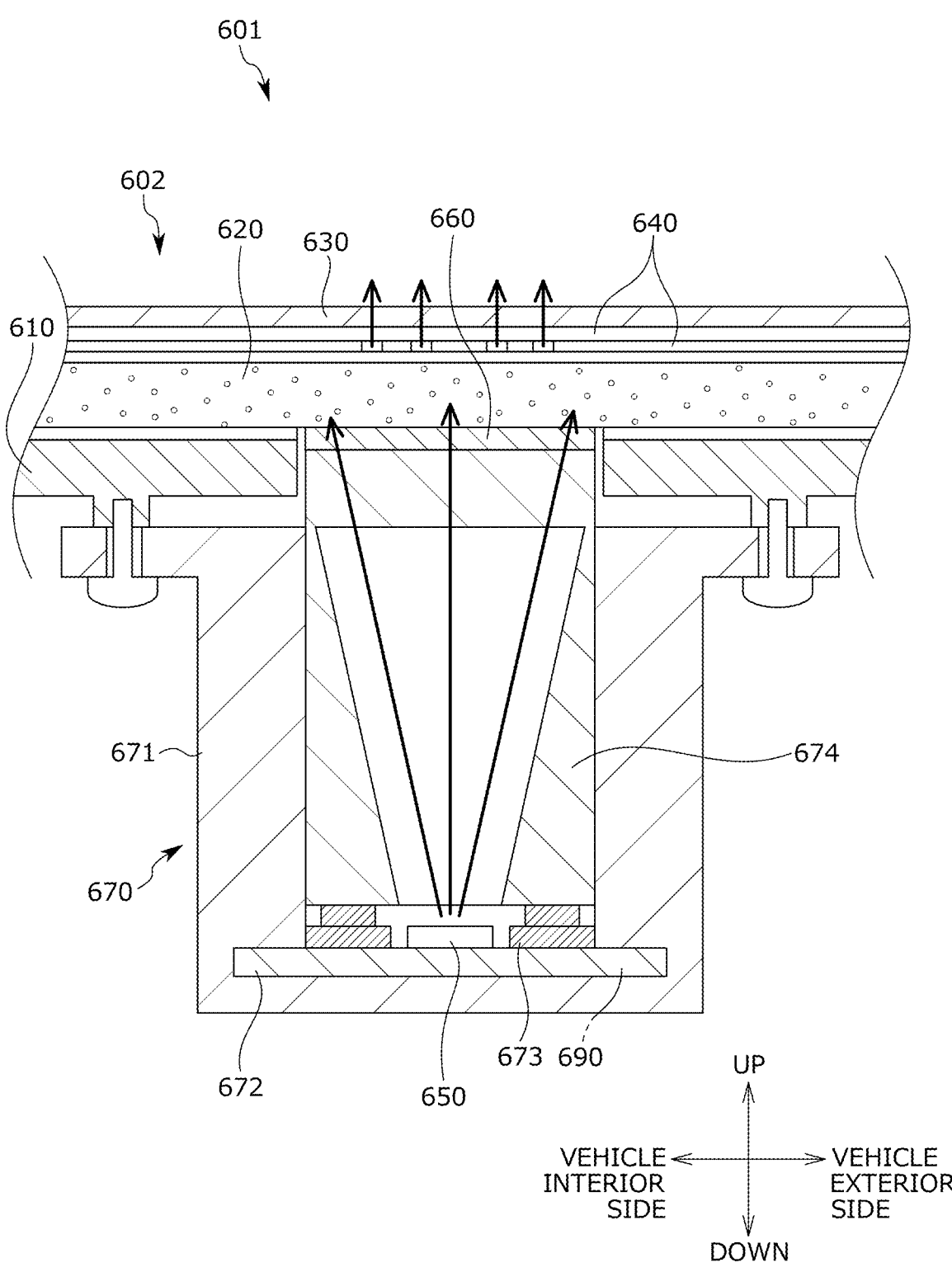
FIG. 11 is a cross-sectional view of a door lining (armrest) of a seventh embodiment.

Next, a door lining 601 of a seventh embodiment will be described with reference to FIG. 11.

Furthermore, description of the same contents as those of the door lining 1 described above will be omitted.

The door lining 601 (armrest 602) includes an armrest base material 610, a pad material 620, a skin material 630, a printed layer 640, a light emission body 650, a proximity sensor 660, a switch device 670, and a control unit 690.

The switch device 670 includes a switch housing 671, a support substrate 672, a plurality of push switches 673, and a switch transmission body 674.

The upper surface of the switch transmission body 674 is disposed at a position below the upper surface of the armrest base material 610. The upper end of the switch transmission body 674 is disposed at the same position as the armrest base material 610 in the thickness direction of the armrest 602.

The proximity sensor 660 is a capacitance type sensor, and is disposed on the upper surface of the switch transmission body 674 and is in contact with the rear surface of the pad material 620. The proximity sensor 660 may be printed on the upper surface of the switch transmission body 674.

In this way, the capacitance type proximity sensor 660 can accurately detect a human body located directly above the switch transmission body 674.

The proximity sensor 660 is disposed between the pad material 620 and the switch transmission body 674 in the thickness direction of the armrest 2.

The proximity sensor 660 is adhered to the upper surface of the switch transmission body 674 and is not attached to the armrest base material 610.

In this way, the proximity sensor 660 and the switch transmission body 674 can be simply assembled. Further, since the proximity sensor 660 and the armrest base material 610 are not attached, the proximity sensor 660 can be easily replaced when necessary.

In the above-described configuration, a lens (a diffusion lens including a diffusion material) may be attached inside the switch transmission body 674. In this way, the light from the light emission body 650 can be guided toward the skin material 630 and the printed layer 640 while being more diffused.

Other Embodiments

In the above-described embodiments, as shown in FIG. 1, the door lining 1 includes the switch device 70 provided in the armrest 2, but the present invention is not particularly thereto, and the switch device 70 may be provided in another part of the door lining.

The switch device 70 may be disposed in the conveyance interior part other than the door lining.

Figure 12:
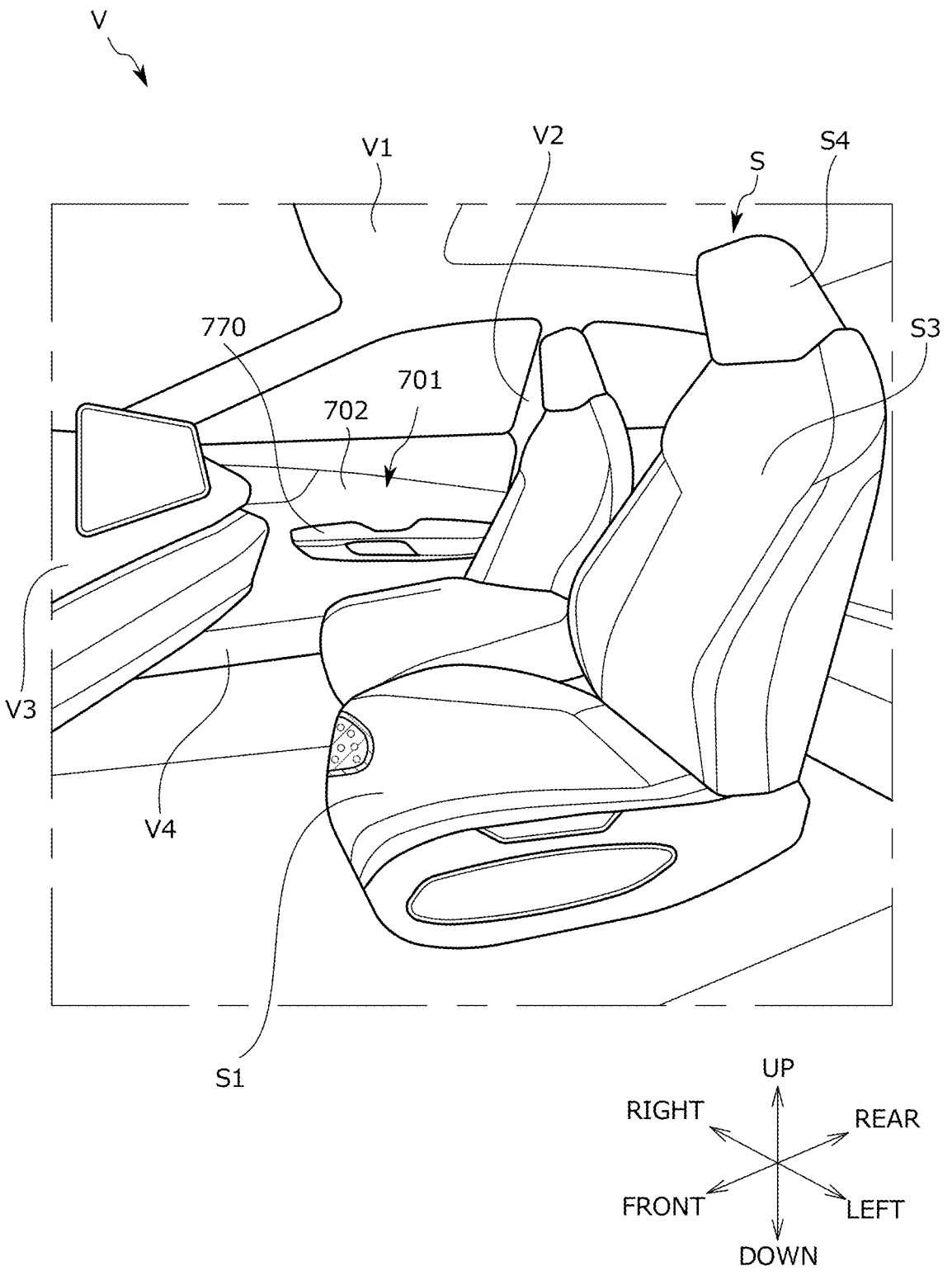
FIG. 12 is a diagram illustrating other embodiments.

Specifically, the example is shown in FIG. 12.

As shown in FIG. 12, a switch device 770 may be disposed in a door trim 702 of a door lining 701.

The switch device 770 may be disposed on a roof V1, a center pillar V2, an instrument panel V3, a side sill V4, a center console, a steering wheel, etc.

The switch device 770 may be disposed on a side portion of the seat cushion S1 of the vehicle seat S, on a rear surface of a seat back S3, at the shoulder of the seat back S3, or on a rear surface of a headrest S4.

The switch device 770 may be disposed in a center armrest at the center of the rear seat of the conveyance.

In the above-described embodiment, as shown in FIG. 3, the armrest 2 includes the armrest base material 10, the pad material 20, and the skin material 30, but the present invention is not particularly limited thereto, and the pad material 20 may be unnecessary. In that case, the skin material 30 may be a cover material such as a resin material.

In the above-described embodiment, as a specific example, the conveyance interior parts used in automobiles have been described, but the present invention is not limited thereto, and can be used for conveyance interior parts such as motorcycle interior parts, train interior parts, bus interior parts, etc. Alternatively, the present invention can be used for conveyance interior parts such as airplanes and ships.

In this embodiment, the conveyance interior part (door lining) according to the present invention has been mainly described.

However, the above-described embodiment is merely an example for facilitating understanding of the present invention, and does not limit the present invention. The present invention can be modified and improved without departing from the spirit of the present invention, and it goes without saying that the present invention includes its equivalents.

REFERENCE SIGNS LIST

First Embodiment

V: vehicle (conveyance)
D: vehicle door (conveyance door)
D1: door panel
1: door lining (conveyance interior part)
2: armrest
3: operation handle
4: pocket
10: armrest base material (base material)
11: through hole
12: attachment boss
15: adhesive
20: pad material
25: adhesive
30: skin material (cover material)
40: printed layer
40a: printed surface
40b, 40c, 40d: operation icon
40e: multi-purpose touch pad
41: first printed layer
42: second printed layer
50: light emission body (light source)
60: proximity sensor (capacitance type sensor)
70: switch device
71: switch housing
71a: bottom wall portion
71b: side wall portion
71c: flange wall portion
71d: first accommodating portion
71e: second accommodating portion
71f: substrate attachment portion
71g: inner space
72: support substrate
73: push switch
74: switch transmission body
74a: hollow portion
74b: solid portion
74c: hollow hole
75: attachment bolt 80: door heater
85: lighting device
90: control unit (controller)
S: vehicle seat (conveyance seat, conveyance interior part)
S1: seat cushion
S2: rail device
S2a: fixed rail
S2b: movable rail
P: power source

Second Embodiment

101: door lining (conveyance interior part)
102: armrest
110: armrest base material (base material)
120: pad material
130: skin material (cover material)
140: printed layer
150: light emission body
160: proximity sensor
170: switch device
171: switch housing
173: push switch
174: switch transmission body
174b: solid portion
190: control unit

Third Embodiment

201: door lining (conveyance interior part)
202: armrest
210: armrest base material (base material)
220: pad material
221: first pad material
222: second pad material
230: skin material (cover material)
240: printed layer
250: light emission body
260: proximity sensor
270: switch device
271: switch housing
274: switch transmission body
290: control unit

Fourth Embodiment

301: door lining (conveyance interior part)
302: armrest
310: armrest base material (base material)
312: through hole
320: pad material
323: accommodating recess
330: skin material (cover material)
340: printed layer
340a: printed surface
350: light emission body
360: proximity sensor
370: switch device
374: switch transmission body
374c: hollow hole
375: lens
390: control unit

Fifth Embodiment

401: door lining (conveyance interior part)
402: armrest
410: armrest base material (base material)
411: through hole
412: attachment boss
420: pad material
423: accommodating recess
430: skin material (cover material)
440: printed layer
450: light emission body
460: proximity sensor
470: switch device
472: support substrate
472a: substrate attachment portion
473: push switch
475: lens
490: control unit

Sixth Embodiment

501: door lining (conveyance interior part)
502: armrest
510: armrest base material (base material)
520: pad material
430: skin material (cover material)
540: printed layer
550: light emission body
560: proximity sensor
570: switch device
573: push switch
574: switch transmission body
590: control unit

Seventh Embodiment

601: door lining (conveyance interior part)
602: armrest
610: armrest base material (base material)
620: pad material
630: skin material (cover material)
640: printed layer
650: light emission body
660: proximity sensor
670: switch device
671: switch housing
672: support substrate
673: push switch
674: switch transmission body
690: control unit

Other Embodiments

V: vehicle (conveyance)
V1: roof
V2: center pillar
V3: instrument panel
V4: side sill
701: door lining (conveyance interior part)
702: door trim
770: switch device
S: vehicle seat
S1: seat cushion
S3: seat back
S4: headrest

21

The invention claimed is:

1. A conveyance interior part provided inside a conveyance, comprising:

a cover material which has optical transparency;

a printed layer which is disposed on a rear surface side of the cover material and has a predetermined printed surface;

a light emission body which is disposed on a rear surface side of the cover material and the printed layer and emits light toward the cover material and the printed layer;

a proximity sensor which is disposed on a rear surface side of the cover material and detects an approach of a detection target;

a control unit which controls the light emission body based on a detection signal of the proximity sensor; and a switch device which includes a push switch disposed on a rear surface side of the cover material and detecting pressure from the cover material side, wherein the control unit controls the light emission body not to emit light while the proximity sensor does not detect the detection target and controls the light emission body to emit light while the proximity sensor detects the detection target, wherein the push switch is disposed at a position corresponding to a position in which the printed surface is displayed by the light emission body in a surface of the cover material, wherein the proximity sensor is disposed on a rear surface side of the cover material and is disposed on a front surface side of the switch device and the light emission body in a thickness direction of the conveyance interior part, wherein the cover material is a skin material which has optical transparency, wherein the conveyance interior part includes a pad material disposed on a rear surface side of the skin material and the printed layer and having optical transparency, wherein the switch device includes a support substrate which is disposed on a rear surface side of the light emission body and the push switch and supports the light emission body and the push switch, and wherein the light emission body and the push switch are disposed at different positions on the support substrate.

2. The conveyance interior part according to claim 1, wherein the proximity sensor is a capacitance type sensor, and wherein the control unit controls the light emission body to emit light while the capacitance type sensor detects the detection target.

3. The conveyance interior part according to claim 1, wherein the switch device includes a switch transmission body which is disposed on a front surface side of the push switch and transmits pressure from the cover material side to the push switch, and wherein the proximity sensor is a capacitance type sensor and is printed on an upper surface of the switch transmission body or disposed on the upper surface of the switch transmission body.

4. The conveyance interior part according to claim 3, wherein the conveyance interior part includes a base material which is disposed between the cover material and the switch device in the thickness direction of the conveyance interior part,

wherein the proximity sensor is disposed between the pad material and the switch device in the thickness direction of the conveyance interior part, and wherein the proximity sensor is attached to an upper surface of the switch transmission body and is not attached to the base material and the pad material.

5. The conveyance interior part according to claim 1, wherein the control unit recognizes a detection signal from the push switch as valid when the detection signal from the push switch is output within a predetermined time after a detection signal from the proximity sensor is output.

6. A conveyance interior part provided inside a conveyance, comprising:

a cover material which has optical transparency;

a printed layer which is disposed on a rear surface side of the cover material and has a predetermined printed surface;

a light emission body which is disposed on a rear surface side of the cover material and the printed layer and emits light toward the cover material and the printed layer;

a proximity sensor which is disposed on a rear surface side of the cover material and detects an approach of a detection target;

a control unit which controls the light emission body based on a detection signal of the proximity sensor; and a switch device which includes a push switch disposed on a rear surface side of the cover material and detecting pressure from the cover material side, wherein the control unit controls the light emission body not to emit light while the proximity sensor does not detect the detection target and controls the light emission body to emit light while the proximity sensor detects the detection target, wherein the push switch is disposed at a position corresponding to a position in which the printed surface is displayed by the light emission body in a surface of the cover material, wherein the proximity sensor is disposed on a rear surface side of the cover material and is disposed on a front surface side of the switch device and the light emission body in a thickness direction of the conveyance interior part, wherein the conveyance interior part includes a base material which is disposed between the cover material and the switch device in the thickness direction of the conveyance interior part, wherein a through hole is formed in a portion corresponding to the push switch in a surface of the base material, wherein the switch device includes a switch transmission body which is disposed on a front surface side of the push switch and transmits pressure from the cover material side to the push switch, and wherein a part of the switch transmission body penetrates the through hole and is disposed at the same position as the base material in the thickness direction of the conveyance interior part.

7. The conveyance interior part according to claim 6, wherein the cover material is a skin material which has optical transparency, wherein the conveyance interior part includes a pad material which is disposed on a rear surface side of the skin material and the printed layer and has optical transparency, wherein the base material is disposed between the pad material and the switch device, wherein the pad material is attached to a surface of the base material, and wherein the switch transmission body is not attached to the pad material and the skin material.

8. The conveyance interior part according to claim 6, wherein the switch device includes a switch housing which accommodates the push switch and the switch transmission body which is movably attached to the switch housing, wherein the switch housing includes a substrate attachment portion which is provided on a surface of the switch housing and is attached to a rear surface of the base material, wherein the surface of the base material has an inclined shape that is inclined with respect to the surface of the switch housing or a curved shape that is curved with respect to the surface, wherein a part of the switch transmission body protrudes toward a front surface side beyond the switch housing, and wherein a protruding surface of the switch transmission body has a shape that follows the inclined shape or curved shape of the surface of the base material.

9. The conveyance interior part according to claim 6, wherein the switch device includes a switch housing which accommodates the push switch and the switch transmission body which is movably attached to the switch housing, wherein the switch housing includes a substrate attachment portion which is provided on a surface of the switch housing and is attached to a rear surface of the base material, wherein a convex attached portion for attaching the substrate attachment portion is formed on a rear surface of the base material, and wherein the proximity sensor is disposed between the base material and the switch housing in the thickness direction of the conveyance interior part and is disposed between the switch transmission body and the attached portion in a direction orthogonal to the thickness direction of the conveyance interior part.

10. The conveyance interior part according to claim 9, wherein the proximity sensor is positioned between the switch transmission body and the attached portion of the base material in a direction orthogonal to the thickness direction of the conveyance interior part, and wherein the proximity sensor is not attached to the switch transmission body and the base material.

11. The conveyance interior part according to claim 6, wherein the cover material is a skin material which has optical transparency, wherein the conveyance interior part includes a pad material which is disposed on a rear surface side of the skin material and the printed layer and is disposed on a front surface side of the base material, wherein the pad material includes a first pad material which has optical transparency and a second pad material which has optical impermeability, wherein the base material is disposed between the pad material and the switch device, wherein the first pad material is disposed at a portion overlapping the switch transmission body in the entire pad material, and wherein the second pad material is disposed at a position overlapping the base material in the entire pad material.

12. The conveyance interior part according to claim 6, wherein the cover material is a skin material which has optical transparency, wherein the conveyance interior part includes a pad material which is disposed on a rear surface side of the skin material and the printed layer and has optical transparency, wherein the base material is disposed between the pad material and the switch device, wherein the switch transmission body is configured to transmit light emitted from the light emission body, wherein an accommodating recess for accommodating a part of the switch transmission body is formed on a rear surface of the pad material, and wherein an upper portion of the switch transmission body faces the accommodating recess and is accommodated in the accommodating recess.

13. The conveyance interior part according to claim 6, wherein an upper surface of the switch transmission body has a curved shape or step shape and is disposed at a position above an upper surface of the base material.

14. The conveyance interior part according to claim 6, wherein an upper surface of the switch transmission body is disposed at a position below an upper surface of the base material, and wherein a part of the switch transmission body is disposed at the same position of the base material in the thickness direction of the conveyance interior part.

15. The conveyance interior part according to claim 6, wherein the switch device includes a switch housing which accommodates the push switch and the switch transmission body which is movably attached to the switch housing, wherein the switch housing includes a substrate attachment portion which is provided on a surface of the switch housing and is attached to a rear surface of the base material, and wherein the proximity sensor is disposed between the base material and the switch housing in the thickness direction of the conveyance interior part, and is not held by the base material but by the switch housing.

16. The conveyance interior part according to claim 6, wherein the switch device includes a switch housing which accommodates the push switch and the switch transmission body which is movably attached to the switch housing, wherein the switch housing includes a substrate attachment portion which is provided on a surface of the switch housing and is attached to a rear surface of the base material, and wherein the proximity sensor is disposed around the switch transmission body.

17. A conveyance interior part provided inside a conveyance, comprising:

a cover material which has optical transparency;

a printed layer which is disposed on a rear surface side of the cover material and has a predetermined printed surface;

a light emission body which is disposed on a rear surface side of the cover material and the printed layer and emits light toward the cover material and the printed layer;

a proximity sensor which is disposed on a rear surface side of the cover material and detects an approach of a detection target;

a control unit which controls the light emission body based on a detection signal of the proximity sensor; and a switch device which includes a push switch disposed on a rear surface side of the cover material and detecting pressure from the cover material side, wherein the control unit controls the light emission body not to emit light while the proximity sensor does not detect the detection target and controls the light emission body to emit light while the proximity sensor detects the detection target, wherein the push switch is disposed at a position corresponding to a position in which the printed surface is displayed by the light emission body in a surface of the cover material, wherein the proximity sensor is disposed on a rear surface side of the cover material and is disposed on a front surface side of the switch device and the light emission body in a thickness direction of the conveyance interior part, wherein the conveyance interior part further includes a door lining having an armrest and a conveyance seat, wherein the conveyance seat includes a seat cushion and a rail device which allows the seat cushion to be movable forward and backward, wherein the rail device includes a fixed rail which is fixed to a conveyance floor and a movable rail which is attached to the fixed rail to be movable forward and backward together with the seat cushion, and wherein the switch device is disposed in a front portion of the armrest and is disposed at a front position of a front end of the fixed rail.

* * * * *